United States Patent
Ishida et al.

(10) Patent No.: US 8,696,499 B2
(45) Date of Patent: Apr. 15, 2014

(54) BELT-TYPE CONTINUOUS STEPLESS SPEED CHANGER

(75) Inventors: Yousuke Ishida, Shizuoka (JP); Masaru Oosuga, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 411 days.

(21) Appl. No.: 12/644,578

(22) Filed: Dec. 22, 2009

(65) Prior Publication Data
US 2010/0099522 A1 Apr. 22, 2010

Related U.S. Application Data

(62) Division of application No. 10/547,614, filed as application No. PCT/JP2004/001972 on Feb. 20, 2004, now Pat. No. 7,648,435.

(30) Foreign Application Priority Data

Feb. 28, 2003 (JP) ................................. 2003-054219
Oct. 29, 2003 (JP) ................................. 2003-369016

(51) Int. Cl.
F16H 55/56 (2006.01)

(52) U.S. Cl.
USPC ............................................................ 474/8

(58) Field of Classification Search
USPC ..................... 474/8, 177, 244, 237, 201, 174; 419/8–11, 14, 35; 106/36; 29/800, 875, 29/878, 885, 888, 888.074
See application file for complete search history.

(56) References Cited

U.S. PATENT DOCUMENTS

| | | | | |
|---|---|---|---|---|
| 2,877,716 A * | 3/1959 | Ryznar John W | ............ | 104/306 |
| 2,987,495 A * | 6/1961 | Harvey et al. | .................. | 523/157 |
| 3,645,960 A * | 2/1972 | Haag | .............................. | 524/493 |
| 4,086,153 A * | 4/1978 | Ariga et al. | ..................... | 204/507 |
| 4,219,452 A * | 8/1980 | Littlefield | ...................... | 523/149 |
| 4,220,223 A * | 9/1980 | Rinker et al. | ................ | 188/73.1 |
| 4,484,903 A * | 11/1984 | Schneider | ...................... | 474/242 |
| 4,734,087 A * | 3/1988 | Takano et al. | .................. | 474/270 |
| 4,790,799 A * | 12/1988 | Sadler | ............................ | 474/268 |
| 4,898,567 A * | 2/1990 | Tatara et al. | ................... | 474/174 |
| 5,011,461 A * | 4/1991 | Brouwers | ...................... | 474/188 |
| 5,371,136 A * | 12/1994 | Brooks et al. | .................. | 524/526 |
| 6,306,055 B1 * | 10/2001 | Serkh | ............................. | 474/242 |
| 6,942,590 B2 * | 9/2005 | Okuno et al. | .................. | 474/242 |
| 2002/0183152 A1 * | 12/2002 | Kobayashi | ..................... | 474/242 |

OTHER PUBLICATIONS

Ishida et al.; "Belt-Type Continuously Variable Transmission"; U.S. Appl. No. 10/547,614, filed May 15, 2006.
Ishida et al.; "Belt-Type Continuous Stepless Speed Changer"; U.S. Appl. No. 12/644,619, filed Dec. 22, 2009.
Ishida et al.; "Belt-Type Continuous Stepless Speed Changer"; U.S. Appl. No. 12/644,627, filed Dec. 22, 2009.

* cited by examiner

*Primary Examiner* — William A Rivera
*Assistant Examiner* — Henry Liu
(74) *Attorney, Agent, or Firm* — Keating & Bennett, LLP

(57) ABSTRACT

A belt-type continuously variable transmission includes a primary sheave including a pair of first clamp surfaces, a secondary sheave including a pair of second clamp surfaces, and a belt endlessly wound between both of the primary and secondary sheaves. The belt includes contact surfaces clamped between the first clamp surfaces and between the second clamp surfaces. Powder having infusibility as a friction enhancing material is held on at least one of the first clamp surfaces of the primary sheave, the second clamp surfaces of the secondary sheave, and the contact surfaces of the belt.

6 Claims, 8 Drawing Sheets

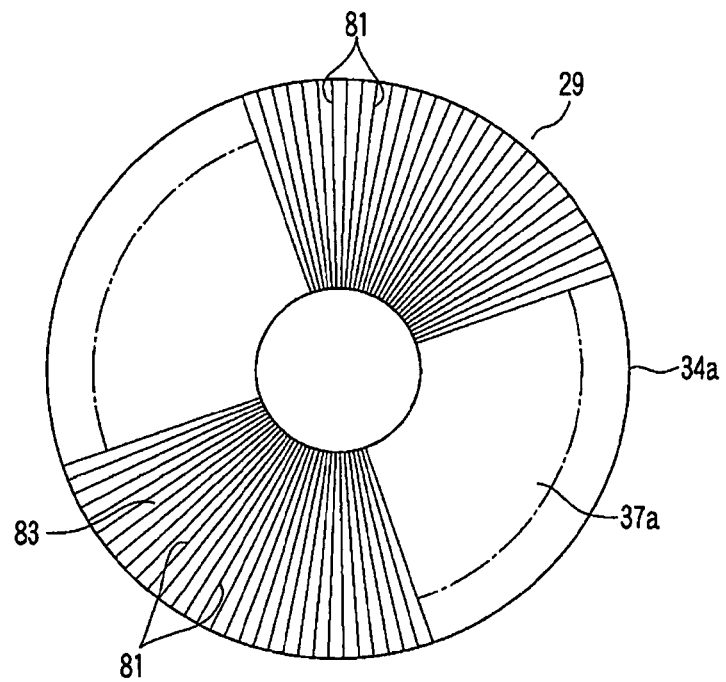
FIG. 15
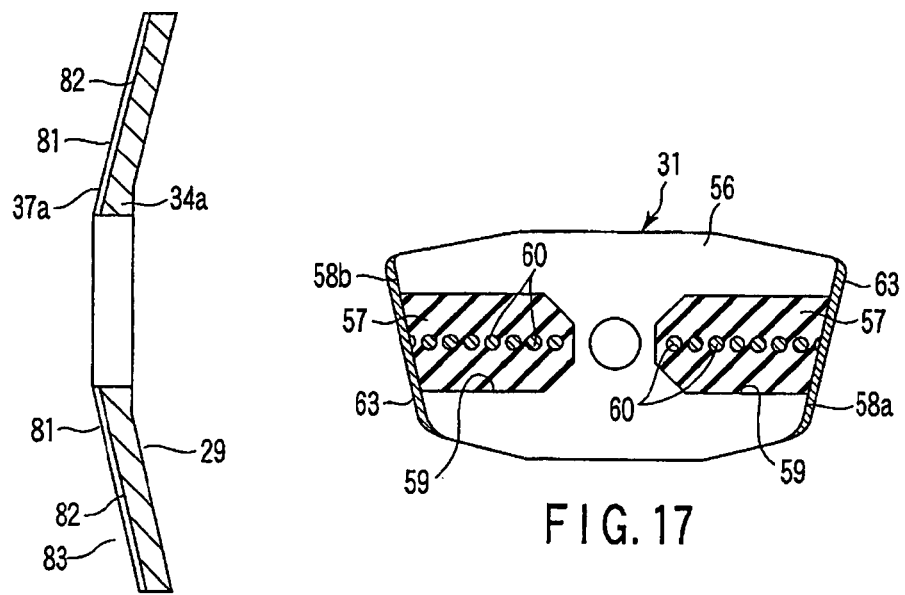
FIG. 16
FIG. 17

BELT-TYPE CONTINUOUS STEPLESS SPEED CHANGER

BACKGROUND OF THE INVENTION

1. Field of the Invention

The present invention relates to a belt-type continuously variable transmission that transmits a torque of a primary sheave to a secondary sheave via an endless belt, and a sheave and a belt that are used in this continuously variable transmission, and more particularly to a structure for preventing slipping of the belt at an initial stage of driving. Further, the present invention relates to a vehicle such as a motorcycle mounted with the belt-type continuously variable transmission.

2. Description of the Related Art

JP-A-2002-147553, for instance, discloses a belt-type continuously variable transmission for motorcycles, which can steplessly adjust a transmission gear ratio according to a condition of running. This belt-type continuously variable transmission includes a primary sheave, a secondary sheave, and a belt.

The primary sheave is driven by power transmission from an engine. The primary sheave has a pair of clamp surfaces opposed to each other and a belt groove formed between these clamp surfaces. The secondary sheave is interlocked with a rear wheel of the motorcycle via a reduction mechanism. This secondary sheave has a pair of clamp surfaces opposed to each other and a belt groove formed between these clamp surfaces.

The belt is endlessly wound between the belt groove of the primary sheave and the belt groove of the secondary sheave. The belt has contact surfaces for contact with the clamp surfaces of the respective sheaves. Torque of the primary sheave is transmitted to the secondary sheave via the belt by frictional force generated between the contact surfaces of the belt and the clamp surfaces of the respective sheaves.

As is shown in FIG. 18, this kind of belt-type continuously variable transmission has a characteristic that, as thrust, which causes the clamp surfaces of the respective sheaves to clamp the belt, increases, the torque transmissible between the sheaves and the belt increases accordingly. When the thrust acting on the belt increases, a great frictional resistance is generated between the clamp surfaces of the sheaves and the contact surfaces of the belt, and an amount of heat generation of the belt increases. The heat generation of the belt indicates that kinetic energy is converted into thermal energy. The transmission efficiency of torque decreases by a degree corresponding to the conversion from kinetic energy to thermal energy.

FIG. 19 shows transition of an amount of heat generation of the belt and transmission efficiency at the time when the thrust acting on the belt is varied. As it is evident from FIG. 19, if the thrust increases, the amount of heat generation of the belt increases in proportion to the increase in the thrust, and the transmission efficiency of torque decreases. Therefore, it is necessary to set the thrust to a necessary minimum level in order to increase the transmission efficiency of torque between the sheaves and the belt.

On the other hand, in the belt-type continuously variable transmission, the clamp surfaces of the respective sheaves are subjected to machining such as cutting and grinding. This kind of machining is performed while the sheave is being rotated. Therefore, a large number of annular grooves along a peripheral direction are formed on the clamp surfaces of the sheaves. The grooves are very fine with width and depth of about several μm.

Incidentally, according to the conventional belt-type continuously variable transmission, when driving is started in a newly assembled state, slipping tends to occur in the belt, in particular, at the initial stage of driving. FIG. 20 shows transition of transmission torque of the belt at the initial stage of driving. As it is evident from FIG. 20, the torque transmitted to the belt is significantly lower than a predetermined set value C immediately after driving is started. A value of this torque tends to gradually increase as driving time elapses. After certain time elapses, the torque reaches the set value.

It is assumed that this phenomenon occurs because of the grooves present on the clamp surfaces of the sheaves in a brand new state. In short, it appears that the presence of the grooves makes a contact state between the sheaves and the belt unstable, causing the slip of the belt.

Therefore, in driving the new belt-type continuously variable transmission, trial-runs of the continuously variable transmission need to be performed until the torque transmitted to the belt reaches the set value. By performing the trial-runs, the contact surfaces of the belt are abraded by edges of the grooves of the sheaves and sharp edges of the grooves are worn. Consequently, the grooves of the sheave are filled with abrasion waste and the clamp surfaces of the sheaves are smoothed. As a result, the state of contact between the sheaves and the belt is stabilized and the slip of the belt is controlled. As shown in FIG. 20, desired transmission torque is obtained when predetermined trial-run is completed.

In the conventional belt-type continuously variable transmission, however, the trial-runs need to be continued until the slip of the belt is completely eliminated. Consequently, long time is required until the continuously variable transmission is set in a drivable state and a great deal of labor is required for shipment of the product, causing an increase in cost.

In order to control the slipping of the belt at the initial stage of driving, it is conceivable to increase the thrust acting on the belt. However, if the thrust is increased, the amount of heat generation of the belt inevitably increases as described above. Therefore, after the completion of the trial-run, the thrust acting on the belt becomes excessively large and the transmission efficiency of the torque is deteriorated.

SUMMARY OF THE INVENTION

Preferred embodiments of the present invention provide a belt-type continuously variable transmission that prevents slipping of a belt while controlling thrust acting on the belt to a necessary minimum necessary level, and a vehicle including such a belt-type continuously variable transmission.

According to a preferred embodiment of the present invention, a belt for a continuously variable transmission that is endlessly wound between a primary sheave and a secondary sheave includes contact surfaces clamped by the respective primary and secondary sheaves and arranged to transmit torque of the primary sheave to the secondary sheave, and friction layers including infusible powder disposed on the contact surfaces.

According to another preferred embodiment of the present invention, a belt for a continuously variable transmission that is endlessly wound between a primary sheave and a secondary sheave includes a plurality of resin blocks including contact surfaces clamped by a primary sheave made of metal and a secondary sheave made of metal, a coupling member arranged to endlessly couple the plurality of resin blocks such that the belt is endlessly wound between the primary sheave and the secondary sheave to thereby transmit torque of the primary sheave to the secondary sheave, and friction layers including infusible powder disposed on the contact surfaces of the plurality of resin blocks.

According to another preferred embodiment of the present invention, the friction layers preferably include a material made of a mixture of a binder and carbon black powder.

According to another preferred embodiment of the present invention, the powder has a characteristic such that the powder is not fused by heat that is generated by friction between the contact surfaces and the primary sheave and the secondary sheave.

According to another preferred embodiment of the present invention, the contact surfaces include a plurality of recesses arranged to hold the powder.

Other elements, features, steps, characteristics and advantages of the present invention will become more apparent from the following detailed description of the preferred embodiments with reference to the attached drawings.

BRIEF DESCRIPTION OF THE DRAWINGS

FIG. 15 is a side view of a primary sheave according to a third preferred embodiment of the present invention.

FIG. 16 is a sectional view of the primary sheave according to the third preferred embodiment of the present invention.

FIG. 17 is a sectional view of a belt according to a fourth preferred embodiment of the present invention.

DETAILED DESCRIPTION OF PREFERRED EMBODIMENTS

A first preferred embodiment of the present invention will be hereinafter explained with reference to FIGS. 1 to 12.

Figure 1:
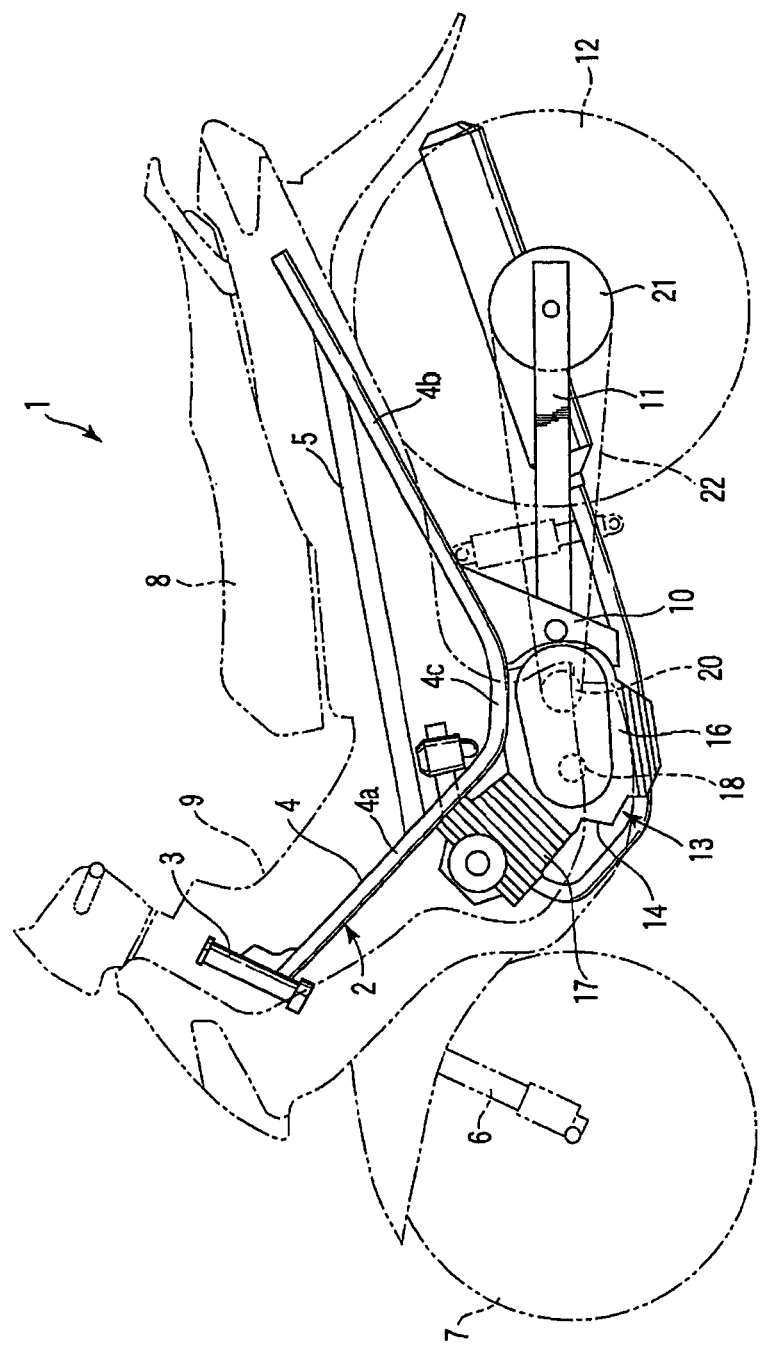
FIG. 1 is a side view of a motorcycle according to a first preferred embodiment of the present invention that is mounted with a belt-type continuously variable transmission.

FIG. 1 discloses a motorcycle 1 that is an example of a vehicle according to a preferred embodiment of the present invention. The motorcycle 1 has a frame 2. The frame 2 includes a steering head pipe 3, a pair of main pipes 4 (only one main pipe 4 is shown) and a pair of seat rails 5 (only one seat rail is shown). The steering head pipe 3 is located at a front end of the frame 2 and supports a front wheel 7 via a front fork 6.

Each of the main pipes 4 extends rearwards from the steering head pipe 3. The main pipe 4 includes a front-half portion 4a that extends obliquely downward from the steering head pipe 3, a rear-half portion 4b that extends obliquely upward from a lower end of the front-half portion 4a, and an intermediate portion 4c that is located between the front-half portion 4a and the rear-half portion 4b.

The seat rail 5 is suspended between the front-half portion 4a and the rear-half portion 4b of the main pipe 4. The seat rail 5 supports a seat 8 over which a rider straddles. The frame 2 is covered with a body cover 9. The body cover 9 continues to the lower end of the seat 8.

A rear arm bracket 10 is fixed to the intermediate portion 4c of each of the main pipes 4. The rear arm bracket 10 projects downward from the intermediate portion 4c of the main pipe 4. The rear arm bracket 10 supports a rear arm 11 that extends rearward. The rear arm 11 is vertically swingable relative to the frame 2. A rear end of the rear arm 11 supports a rear wheel 12 as a running body.

Figure 2:
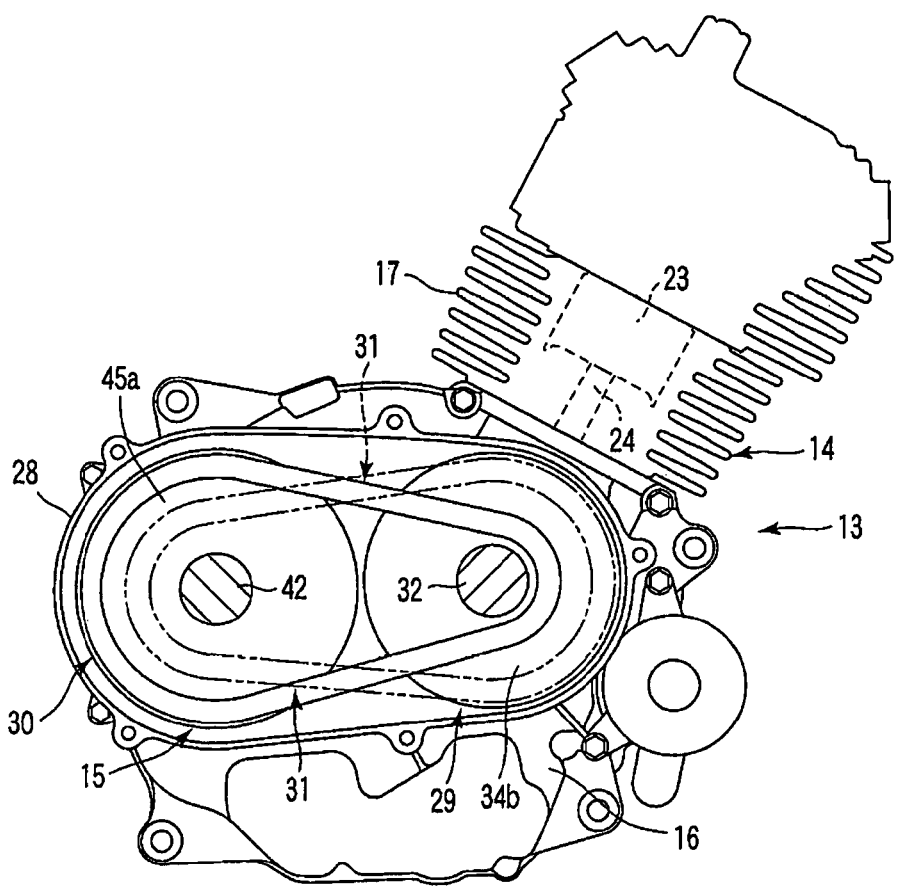
FIG. 2 is a side view of a power unit according to the first preferred embodiment of the present invention that includes a four-cycle engine and the belt-type continuously variable transmission.

The frame 2 supports a power unit 13 that drives the rear wheel 12. As shown in FIGS. 1 and 2, the power unit 13 includes a four-cycle single-cylinder engine 14 as a drive source and a belt-type continuously variable transmission 15. This power unit 13 is covered with a lower part of the body cover 9.

The engine 14 is suspended at the front-half portion 4a of the main pipe 4. The engine 14 includes a crank case 16 and a cylinder 17 coupled to the crank case 16.

Figure 3:
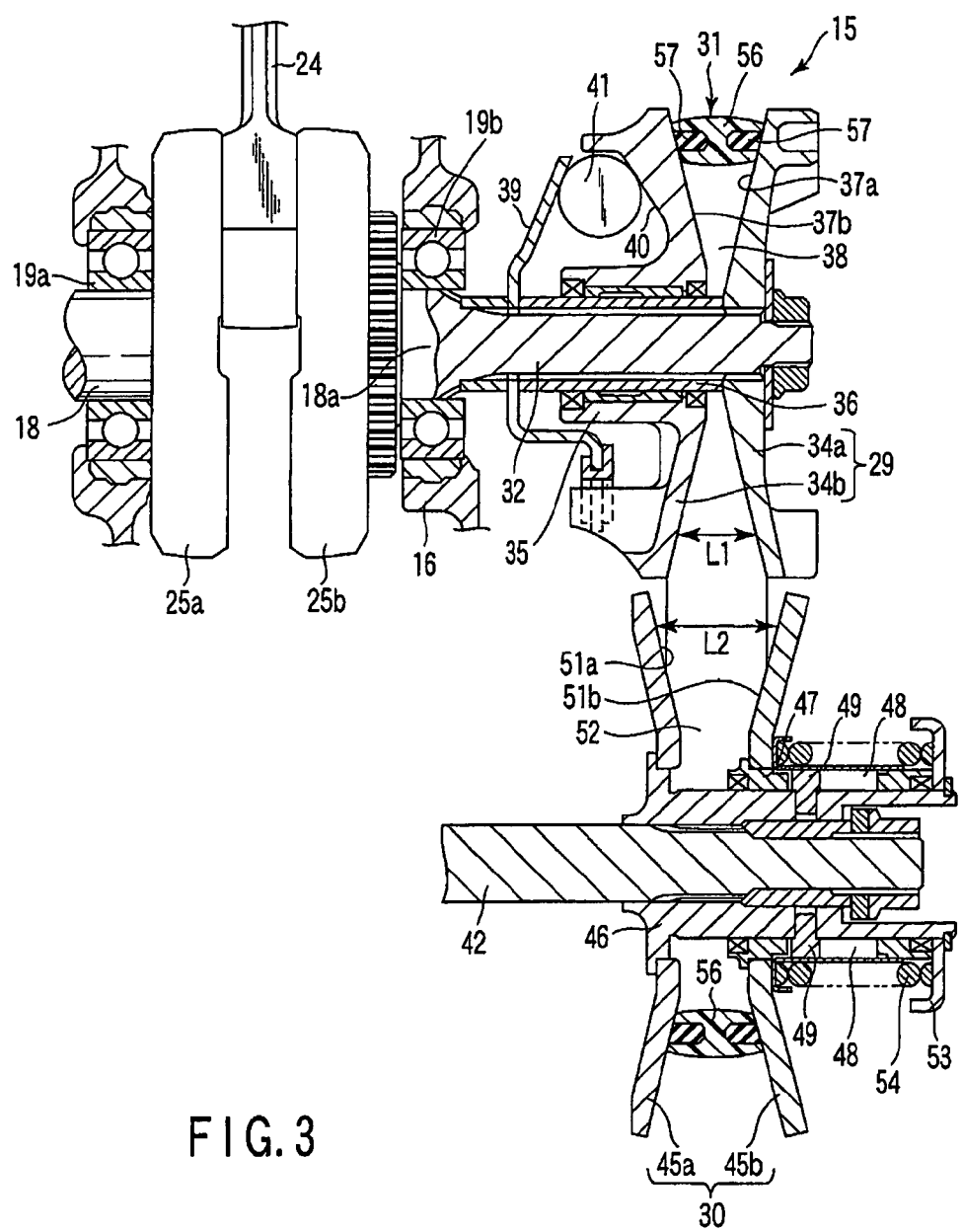
FIG. 3 is a sectional view of the belt-type continuously variable transmission according to the first preferred embodiment of the present invention.

The crank case 16 contains a crank shaft 18 and a not shown gear reduction unit. As shown in FIG. 3, the crank shaft 18 is supported by the crank case 16 via bearings 19a and 19b. The crank shaft 18 is horizontally arranged in a width direction of the motorcycle 1.

The gear reduction unit has a drive sprocket 20 (shown in FIG. 1) at an output end thereof. The drive sprocket 20 is located behind the crank shaft 18. A chain 22 is wound between the drive sprocket 20 and a driven sprocket 21 of the rear wheel 12.

The cylinder 17 of the engine 14 projects upward from the crank case 16 along the front-half portion 4a of the main pipe 4. The cylinder 17 contains a piston 23. The piston 23 is coupled to crank webs 25a and 25b of the crank shaft 18 via a connecting rod 24.

As shown in FIGS. 2 and 3, the belt-type continuously variable transmission (hereinafter referred to as "CVT") 15 is located on the right side of the crank case 16. The CVT 15 is contained in a transmission case 28. The transmission case 28 is fixed to the right side surface of the crank case 16.

The CVT 15 includes a primary sheave 29, a secondary sheave 30, and a belt 31. The primary sheave 29 is located at a front end of the transmission case 28 and supported by an input shaft 32. The input shaft 32 is integrated with the crank shaft 18. In other words, a journal section 18a located at the right end of the crank shaft 18 is extended toward the front end of the transmission case 28 and this extended part also serves as the input shaft 32.

The primary sheave 29 includes a fixed plate 34a and a sliding plate 34b. The fixed plate 34a is fixed to a shaft end of the input shaft 32 and rotates together with the input shaft 32. The sliding plate 34b has a cylindrical boss portion 35. The boss portion 35 is supported on the input shaft 32 via a collar 36. Thus, the sliding plate 34b is slidable in directions in which the sliding plate 34b approaches and moves away from the fixed plate 34a. The sliding plate 34b is rotatable in a peripheral direction of the input shaft 32.

The primary sheave 29 has a pair of first clamp surfaces 37a and 37b. One first clamp surface 37a is formed on the fixed plate 34a. The other first clamp surface 37b is formed on the sliding plate 34b. The first clamp surfaces 37a and 37b have a conical shape and are opposed to each other. The first clamp surfaces 37a and 37b define a first belt groove 38 having a V-sectional shape between the fixed plate 34a and the sliding plate 34b. Width L1 of the first belt groove 38 is adjusted by sliding movement of the sliding plate 34b.

A cam plate 39 is fixed to an outer periphery of the input shaft 32. The cam plate 39 rotates together with the input shaft 32 and is opposed to the sliding plate 34b. The sliding plate 34b is hooked on the cam plate 39 so as to be slidable in the axial direction of the input shaft 32. Accordingly, the cam plate 39 and the sliding plate 34b are movable in directions in which the cam plate 39 and the sliding plate 34b approach and move away from each other while rotating together.

The sliding plate 34b has a cam surface 40 that is opposed to the cam plate 39. Plural roller weights 41 (only one roller weight is shown) are interposed between the cam surface 40 and the cam plate 39. The roller weight 41 moves along the cam surface 40 with centrifugal force that is generated when the crank shaft 18 rotates. According to the movement, the sliding plate 34b slides in the axial direction of the input shaft 32 and the width L1 of the first belt groove 38 changes.

The secondary sheave 30 is located at a rear end of the transmission case 28 and is supported on an output shaft 42. The output shaft 42 is arranged in parallel to the input shaft 32 and coupled to an input end of the gear reduction unit via a not shown automatic centrifugal clutch.

The secondary sheave 30 includes a fixed plate 45a and a sliding plate 45b. The fixed plate 45a has a cylindrical collar 46 at a rotational center thereof. The collar 46 meshes with the outer peripheral surface of the output shaft 42. According to this meshing, the fixed plate 45a and the output shaft 42 rotate together.

The sliding plate 45b has a sleeve 47 at a rotational center thereof. The sleeve 47 is provided on the outer peripheral surface of the collar 46 so as to be slidable in the axial direction. Plural engagement grooves 48 are formed in the sleeve 47. The engagement grooves 48 extend in the axial direction of the sleeve 47 and are arranged in the peripheral direction of the sleeve 47 at intervals.

The collar 46 has plural engaging pins 49. The engaging pins 49 project to the outside of the collar 46 and are slidably fitted in the engagement grooves 48 of the sleeve 47. Consequently, the fixed plate 45a and the sliding plate 45b are movable in directions in which the fixed plate 45a and the sliding plate 45b approach and move away from each other while rotating together.

The secondary sheave 30 has a pair of second clamp surfaces 51a and 51b. One second clamp surface 51a is formed on the fixed plate 45a. The other second clamp surface 51b is formed on the sliding plate 45b. The second clamp surfaces 51a and 51b are formed in a conical shape and are opposed to each other. The second clamp surfaces 51a and 51b define a second belt groove 52 having a V-sectional shape between the fixed plate 45a and the sliding plate 45b. Width L2 of the second belt groove 52 is adjustable according to sliding movement of the sliding plate 45b.

A spring seat 53 is secured to an end of the collar 46. The spring seat 53 is opposed to the sliding plate 45b. A compression coil spring 54 is interposed between the spring seat 53 and the sliding plate 45b. The spring 54 biases the sliding plate 45b toward the fixed plate 45a.

Figure 4:
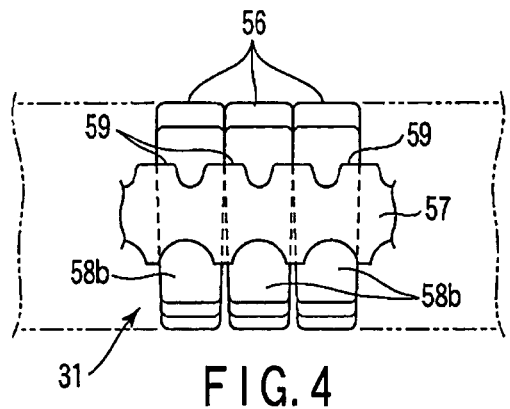
FIG. 4 is a side view of a belt used in the belt-type continuously variable transmission according to the first preferred embodiment of the present invention.
Figure 5:
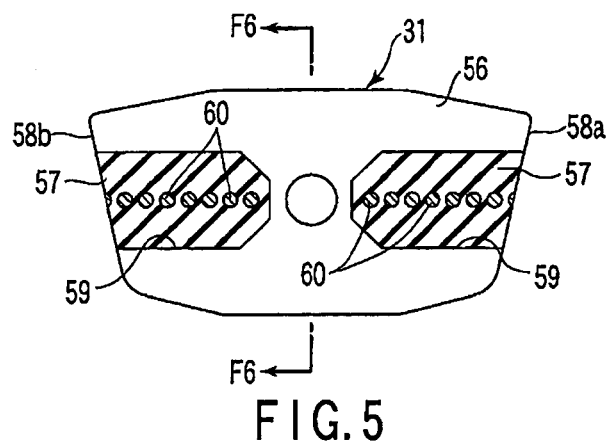
FIG. 5 is a sectional view of the belt used in the belt-type continuously variable transmission according to the first preferred embodiment of the present invention.
Figure 6:
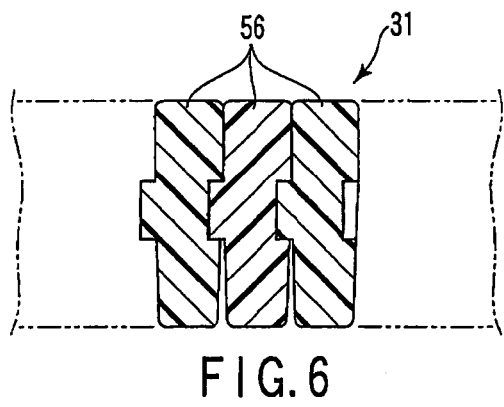
FIG. 6 is a sectional view along line F6-F6 in FIG. 5.
Figure 7:
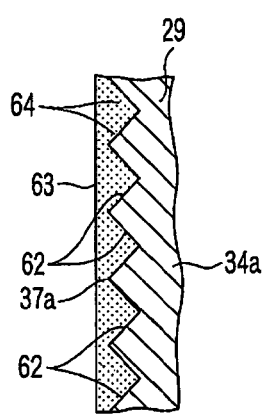
FIG. 7 is a sectional view schematically showing a state in which a friction layer is stacked on a clamp surface of a primary sheave in the first preferred embodiment of the present invention.

As shown in FIG. 3, the belt 31 is endlessly wound between the first belt groove 38 of the primary sheave 29 and the second belt groove 52 of the secondary sheave 30. As shown in FIGS. 4 to 6, the belt 31 includes a plurality of resin blocks 56 and a pair of coupling members 57.

Polyamide resin is used for the resin blocks 56 as a matrix. Carbon fibers or aramid fibers are mixed in the matrix as reinforcement material. The polyamide resin has a high heat resistance and is resistive to a repeated impact load. The polyamide resin can maintain a stable quality over a long time period. The carbon fibers and aramid fibers have both high strength and heat resistance. Therefore, the resin blocks 56 are excellent in heat resistance, wear resistance, and fatigue resistance.

As shown in FIG. 5, each of the resin blocks 56 has a pair of contact surfaces 58a and 58b. The contact surfaces 58a and 58b are located apart from each other in the width direction of the belt 31. The contact surfaces 58a and 58b are inclined so as to extend along the first clamp surfaces 37a and 37b of the primary sheave 29 and the second clamp surfaces 51a and 51b of the secondary sheave 30, respectively. Recesses 59 are formed in central parts of the contact surfaces 58a and 58b of each of the resin blocks 56 respectively.

The coupling members 57 are formed of, for example, refractory rubber. Plural core wires 60 for reinforcement are buried in the coupling members 57. The coupling members 57 have an annular shape and are fitted in the recesses 59 of the resin block 56. Through this fitting, the resin blocks 56 are coupled to one another to constitute the endless belt 31.

The coupling member 57 fitted in the recesses 59 retracts from the contact surfaces 58a and 58b of the resin blocks 56. Therefore, when the belt 31 is wound around the first and the second belt grooves 38 and 52, only the contact surfaces 58a and 58b of the resin blocks 56 come into contact with the first clamp surfaces 37a and 37b of the primary sheave 29 and the second clamp surfaces 51a and 51b of the secondary sheave 30.

In other words, the first clamp surfaces 37a and 37b of the primary sheave 29 and the second clamp surfaces 51a and 51b of the secondary sheave 30 clamp the resin blocks 56 of the belt 31 with predetermined thrust. Consequently, desired transmission torque is obtained between the primary sheave 29 and the belt 31 and between the secondary sheave 30 and the belt 31.

In a state in which the rotation speed of the crank shaft 18 is low, for example, at the time the engine 14 is idling, the roller weights 41 are shifted to a rotational center of the primary sheave 29. Therefore, the sliding plate 34b is located in a position farthest from the fixed plate 34a and the width L1 of the first belt groove 38 is maximized. Consequently, the belt 31 wound around the first belt groove 38 is located at the rotational center of the primary sheave 29. A diameter of the belt 31 wound around the primary sheave 29 is minimized.

On the other hand, in the secondary sheave 30, the sliding plate 45b is biased toward the fixed plate 45a by the spring 54. The width L2 of the second belt groove 52 is minimized. Consequently, the belt 31 wound around the second belt groove 52 is pushed out to an outer periphery of the secondary sheave 30. A diameter of the belt 31 wound around the secondary sheave 30 is maximized. Therefore, the CVT 15 has a maximum transmission gear ratio.

As the number of revolutions of the crank shaft 18 increases, the roller weights 41 move outward in a radial direction of the sliding plate 34b with the centrifugal force. According to this movement, the sliding plate 34b slides toward the fixed plate 34a and the width L1 of the first belt groove 38 gradually decreases. As a result, the belt 31 clamped between the first clamp surfaces 37a and 37b is pushed outward in a radial direction of the primary sheave 29. A diameter of the belt 31 wound around the primary sheave 29 increases.

Conversely, in the secondary sheave 30, the belt 31 is pulled toward the rotational center of the secondary sheave 30. Consequently, the sliding plate 45b slides in a direction in which the sliding plate 45b moves away from the fixed plate 45a against the biasing force of the spring 54. The width L2 of the second belt groove 38 gradually increases. Therefore, a diameter of the belt 31 wound around the secondary sheave 30 decreases. Thus, the transmission gear ratio of the CVT 15 decreases. The transmission gear ratio of the CVT 15 is minimized when a diameter of the belt 31 wound around the primary sheave 29 is maximized.

The fixed plate 34a of the primary sheave 29 and the fixed plate 45a of the secondary sheave 30 are formed of, for example, chromium-molybdenum steel (SCM420) subjected to carburizing, quenching, and tempering treatment. The fixed plates 34a and 45a have surface hardness indicated by 80.+−0.2 HRA. The sliding plate 34b of the primary sheave 29 is formed of a die-cast aluminum alloy (YDC11) subjected to surface treatment such as chrome plating. The sliding plate 34b has surface hardness indicated by 800 HV or more. The sliding plate 45b of the secondary sheave 30 is formed of mechanical structure carbon steel (S35C) and has surface hardness indicated by 63 HB.

The first clamp surfaces 37a and 37b of the primary sheave 29 and the second clamp surfaces 51a and 51b of the secondary sheave 30 are finished in a predetermined shape by machining such as cutting or grinding. Consequently, as represented by the first clamp surface 37a of the primary sheave 29 in FIG. 7, the first clamp surface 37a has a large number of grooves 62 formed by machining. The grooves 62 are very fine with width and depth of about several µm. The grooves 62 are a kind of recess.

The first clamp surfaces 37a and 37b of the primary sheave 29 and each of the second clamp surfaces 51a and 51b of the secondary sheave 30 are covered with friction layers 63 entirely, respectively. The friction layers 63 are obtained by coating, for example, carbon powder 64, which is a friction enhancing material, on the first clamp surfaces 37a and 37b and the second clamp surfaces 51a and 51b, for which machining has been completed. As represented by the first clamping surface 37a of the primary sheave 29 in FIG. 7, the friction layer 63 is stacked on the first clamp surface 37a so as to have thickness enough for burying the grooves 62 sufficiently.

The friction layers 63 do not always have to cover the entire first and second clamp surfaces 37a, 37b, 51a, and 51b. For example, in the first and the second clamp surfaces 37a, 37b, 51a, and 51b, only regions in contact with the belt 31 may be covered with the friction layers 63. In addition, in the first and the second clamp surfaces 37a, 37b, 51a, and 51b, only regions, which clamp the belt 31 when the CVT 15 has a maximum transmission gear ratio, may be covered with the friction layers 63.

The carbon powder 64 has infusibility. The carbon powder 64 has such a characteristic as to withstand the heat and pressure that are generated during the speed change operation of the CVT 15. More specifically, when the belt 31 is clamped between the first clamp surfaces 37a and 37b of the primary sheave 29 and between the second clamp surfaces 51a and 51b of the secondary sheave 30, heat due to friction is generated in contact parts between the contact surfaces 58a and 58b of the belt 31 and the first and the second clamp surfaces 37a, 37b, 51a, and 51b. Consequently, since the carbon powder 31 has such a characteristic that carbon powder is not fused by the heat in the contact parts, the carbon powder 31 can maintain the powder state.

In addition, the carbon powder 64 has hardness lower than that of the first clamp surfaces 37a and 37b of the primary sheave 29 and the second clamp surfaces 51a and 51b of the secondary sheave 30.

In the new CVT 15 that has just been assembled, the first clamp surfaces 37a and 37b of the primary sheave 29 and the second clamp surfaces 51a and 51b of the secondary sheave 30 are covered with the friction layers 63. Consequently, the carbon powder 64 is in a state in which the carbon powder 64 is held on the first and the second clamp surfaces 37a, 37b, 51a, and 51b.

Figure 9:
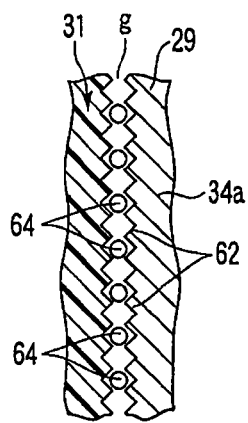
FIG. 9 is a sectional view schematically showing a state in which infusible powder is interposed between the clamp surface of the primary sheave and a contact surface of the belt.

If the driving of the new CVT 15 is started, as represented by the primary sheave 29 in FIG. 9, the carbon powder 64 enters a slight gap g between the primary sheave 29 and the belt 31 at the initial stage of driving. Consequently, a contact area of the primary sheave 29 and the belt 31 and a contact area of the secondary shave 30 and the belt 31 increase. The carbon powder 64 has infusibility in that the carbon powder 64 maintains the powder state even if heat is applied during the speed change operation. Therefore, the carbon powder 64 functions as a slip-stopper for the belt 31.

Figure 8:
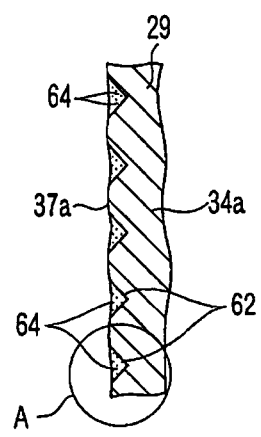
FIG. 8 is a sectional view schematically showing a state in which infusible powder is held on the clamp surface of the primary sheave.
Figure 10:
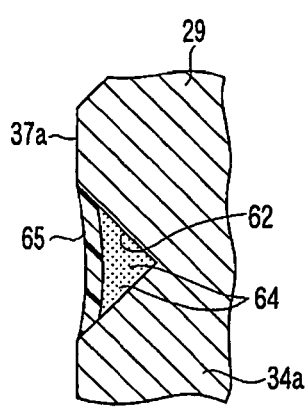
FIG. 10 is a sectional view showing part A in FIG. 8 in an enlarged scale.

FIGS. 8 and 10 disclose a state of the first clamp surface 37a at the time when the driving of the CVT 15 is continues. Since the other first clamp surface 37b and the second clamp surfaces 51a and 51b have the same state as that of the first clamp surface 37a, the first clamp surfaces 37a is described here as a representative.

As driving time elapses, a part of the friction layer 63 covering the first clamp surface 37a is removed from the first clamp surface 37a by the contact with the belt 31 and dispersed into the transmission case 28. Consequently, the carbon powder 64, which enters into the grooves 62, remains on the first clamp surface 37a. At the same time, edges of the grooves 62 are scraped off by the contact with the belt 31, resulting in a decrease in depth of the grooves 62.

On the other hand, in the belt 31, the contact surfaces 58a and 58b of resin blocks 56 are scraped off by the contact with the first clamp surface 37a. Consequently, initial wear of the belt 31 occurs. As shown in FIG. 10, a scraped resin component 65 of the belt 31 is transferred to the groove 62 and cooperates with the carbon powder 64 to fill the groove 62. The first clamp surface 37a is smoothed.

Figure 11:
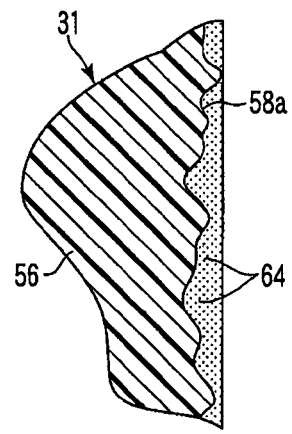
FIG. 11 is a sectional view schematically showing a state in which infusible powder is held on the contact surface of the belt in the first preferred embodiment of the present invention.

As shown in FIG. 11, the carbon powder 64 adheres to the contact surface 58a of the resin block 56. The carbon powder 64 fills uneven portions on the contact surface 58a, thereby smoothing the contact surface 58a. Therefore, the contact state between the contact surface 58a of the belt 31 and the first clamp surface 37a of the primary sheave 29 is stabilized.

According to such a first preferred embodiment of the present invention, at the initial stage of driving of the CVT 15, the carbon powder 64 prevents slipping of the belt 31. Consequently, without increasing thrust for clamping the belt 31, it is possible to improve torque transmission efficiency between the primary sheave 29 and the belt 31 and between the secondary sheave 30 and the belt 31 at the beginning of driving. This makes trial-run unnecessary.

After fixed time elapses from the beginning of driving, the friction layer 63 is removed and the residual carbon powder 64 fills the grooves 62 of the first clamp surface 37a. Consequently, the slip prevention function of the carbon powder 64 is lost. The transmission torque changes to a value corresponding to the thrust between the primary sheave 29 and the belt 31 and between the secondary sheave 30 and the belt 31.

Figure 12:
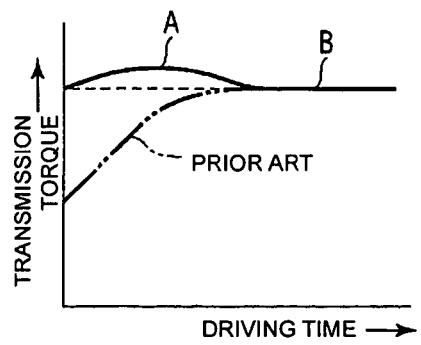
FIG. 12 is a characteristic chart showing transition of transmission torque of the belt with respect to driving time in the first preferred embodiment of the present invention.

FIG. 12 discloses transition of transmission torque following elapse of driving time at the initial stage of driving in CVT 15 of this preferred embodiment. As shown in FIG. 12, a value of transmission torque A at the initial stage of driving is slightly higher than a predetermined original value of transmission torque B because of the presence of the carbon powder 64. This value of the transmission torque A gradually decreases as time elapses and finally coincides with a value of normal transmission torque B. The reason appears to be that the friction layer 63 is removed by the contact with the belt 31 and the slip prevention function of the carbon powder 64 at the initial stage of driving is lost.

According to the above-described structure, the carbon powder 64 has hardness lower than that of the first clamp surfaces 37a and 37b of the primary sheave 29 and the second clamp surfaces 51a and 51b of the secondary sheave 30. Consequently, the carbon powder 64 never damages the first clamp surfaces 37a and 37b or the second clamp surfaces 51a and 51b. Therefore, it is possible to control wear of the first clamp surfaces 37a and 37b or the second clamp surfaces 51a and 51b.

Moreover, according to this preferred embodiment, the plural resin blocks 56 constituting the belt 31 are formed of polyamide resin. Thus, the heat resistance and durability of the belt 31 are improved and stable performance of the belt 31 can be maintained over a long time period.

Figure 13:
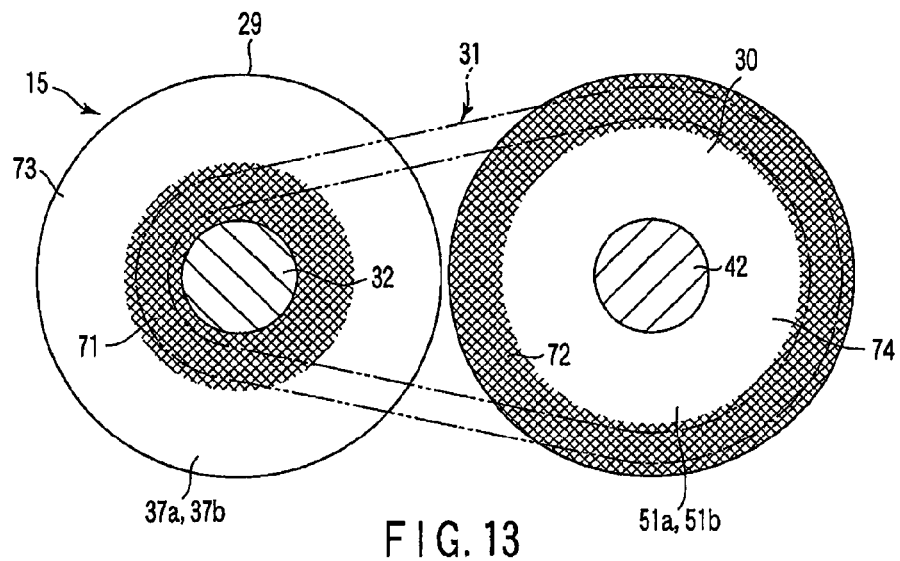
FIG. 13 is a side view of a belt-type continuously variable transmission according to a second preferred embodiment of the present invention showing a positional relationship between a high friction portion of a sheave and a belt at the time when a transmission gear ratio is maximum.
Figure 14:
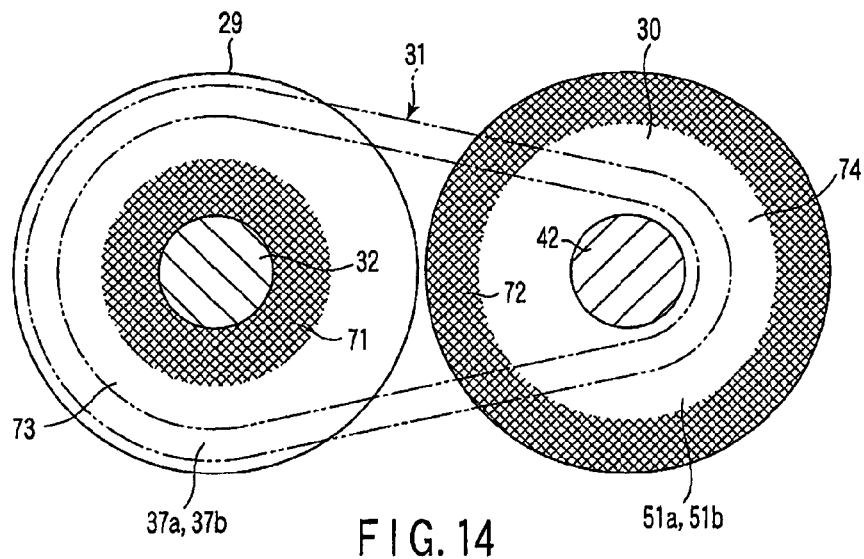
FIG. 14 is a side view of the belt-type continuously variable transmission according to the second preferred embodiment of the present invention showing a positional relationship between the high friction portion of the sheave and the belt at the time when a transmission gear ratio is minimum.
Figure 18:
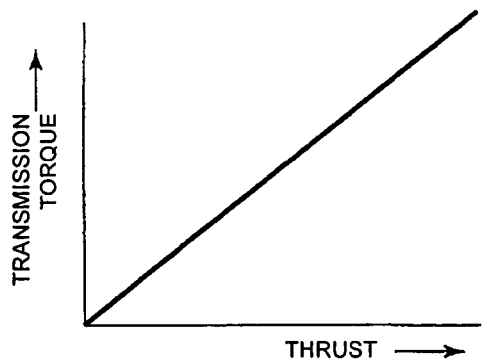
FIG. 18 is a characteristic chart showing a relationship between thrust and transmission torque acting on a belt in a conventional belt-type continuously variable transmission.
Figure 19:
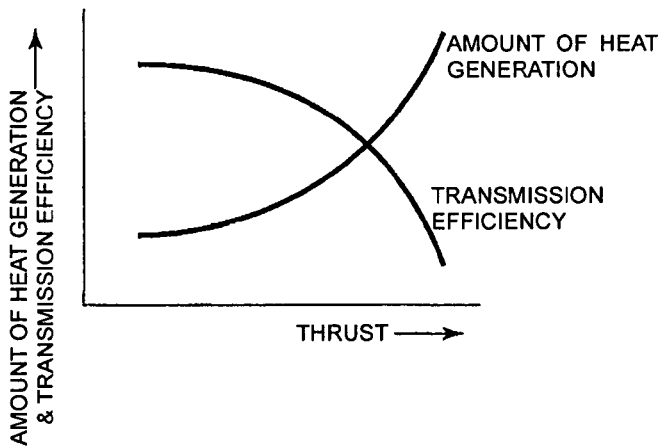
FIG. 19 is a characteristic chart showing a relationship between thrust acting on the belt and an amount of heat generation and transmission efficiency of the belt in the conventional belt-type continuously variable transmission.
Figure 20:
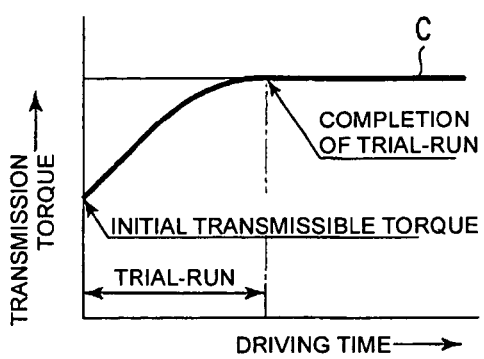
FIG. 20 is a characteristic chart showing transition of transmission torque of the belt with respect to driving time in the conventional belt-type continuously variable transmission.

FIGS. 13 and 14 disclose a second preferred embodiment of the present invention. The second preferred embodiment differs from the first preferred embodiment in the first clamp surfaces 37a and 37b of the primary sheave 29 and the second clamp surfaces 51a and 51b of the secondary sheave 30. The other components of the CVT 15 in the second preferred embodiment are the same as those in the first preferred embodiment. Consequently, in the second preferred embodiment, the components same as those in the first preferred embodiment are denoted by like reference numerals and explanations of the components are omitted.

The first clamp surfaces 37a and 37b of the primary sheave 29 have high friction portions 71. Similarly, the second clamp surfaces 51a and 51b of the secondary sheave 30 have high friction portions 72. The high friction portions 71 and 72 are obtained by subjecting the first clamp surfaces 37a and 37b and the second clamp surfaces 51a and 51b to shot peening or honing respectively. The high friction portions 71 and 72 include a large number of fine uneven portions. The uneven portions are formed to have a net-like pattern with no orientation.

The high friction portions 71 of the primary sheave 29 are annularly formed at the rotational center of the first clamp surfaces 37a and 37b. Consequently, when a diameter of the belt 31 wound around the primary sheave 29 is minimized, the belt 31 is clamped between the high friction portions 71. Portions of the first clamp surfaces 37a and 37b out of the high friction portions 71 are machined surface portions 73 subjected to machining such as cutting or grinding. The high friction portions 70 have a friction coefficient higher than that of the machined surface portion 73.

The high friction portions 72 of the secondary sheave 30 are annularly formed at the outer periphery of the second clamp surfaces 51a and 51b. Consequently, when a diameter of the belt 31 wound around the secondary sheave 30 is maximized, the belt 31 is clamped between the high friction portions 72. Portions of the second clamp surfaces 51a and 51b out of the high friction portions 72 are machined surface portions 74 subjected to machining such as cutting or grinding. The high friction portions 72 have a friction coefficient higher than that of the machined surface portions 74.

Although not shown, the first clamp surfaces 37a and 37b and the second clamp surfaces 51a and 51b are covered with the same friction layers as in the first preferred embodiment. The friction layers are stacked on the first clamp surfaces 37a and 37b and the second clamp surfaces 51a and 51b to thickness enough for filling the grooves formed by machining and the uneven portions of the high friction portions 71 and 72.

According to such a structure, the belt 31 is clamped between the high friction portions 71 of the primary sheave 29 and the high friction portions 72 of the secondary sheave 30 in such a driving state that a diameter of the belt 31 wound around the primary sheave 29 is minimized and a diameter of the belt 31 wound around the secondary sheave 30 is maximized. In other words, in such a driving state that the transmission gear ratio of the CVT 15 is maximized, the belt 31 is clamped between portions of the first clamp surfaces 37a and 37b and the second clamp surfaces 51a and 51b having high friction coefficients.

Consequently, at the initial stage of driving, the carbon powder 64 tends to stop between the primary sheave 29 and the belt 31 and between the secondary sheave 30 and the belt 31. Thus, slipping of the belt 31 can be surely prevented in such a driving state that the transmission gear ratio of the CVT 15 is maximized and the tension acting on the belt 31 is maximized.

According to the structure described above, as the transmission gear ratio of the CVT 15 gradually decreases, the belt 31 moves out of the high friction portions 71 and 72. Therefore, it is possible to prevent wear of the belt 31 in such a driving state that the tension acting on the belt 31 decreases.

The high friction portions 71 and 72 only have to be formed on a part of the first clamp surfaces 37a and 37b and the second clamp surfaces 51a and 51b. A range of machining for obtaining the high friction portions 71 and 72 is small. Accordingly, manufacturing cost of the primary sheave 29 and the secondary sheave 30 can be reduced.

FIGS. 15 and 16 disclose a third preferred embodiment of the present invention.

In the third preferred embodiment, the fixed plate 34a of the primary sheave 29 is described as an example. As shown in FIG. 15, plural rib-like projections 81 are formed on the first clamp surface 37a of the fixed plate 34a. The projections 81 extend radially from the rotational center of the fixed plate 34a over the entire first clamp surface 37a. The projections 81 define plural radial grooves 82 over the first clamp surface 37a. The projections 81 and the grooves 82 are alternately arranged on the first clamp surface 37a. Consequently, the entire first clamp surface 37a functions as a high friction portion 83 with a high friction coefficient.

Although not shown, the first clamp surface 37a is coated with the same friction layer as in the first preferred embodiment. The friction layer is stacked on the first clamp surface 37a to thickness sufficient for filling the projections 81 and the grooves 82.

According to this structure, since the high friction portion 83 is located over the entire first clamp surface 37a, the carbon powder is surely held on the first clamp surface 37a. Even if the position of the wound belt 31 changes, slipping of the belt 31 can be prevented.

FIG. 17 discloses a fourth preferred embodiment of the present invention.

In the fourth preferred embodiment, the contact surfaces 58a and 58b of the belt 31 are covered with friction layers 63 which increases the friction. The structure of the belt 31 is the same as that in the first preferred embodiment. In addition, as in the first preferred embodiment, the friction layers 63 contain infusible carbon powder.

According to the fourth preferred embodiment, the friction layers 63 are stacked on the contact surfaces 58a and 58b of the belt 31 to thickness sufficient for filling the uneven portions of the contact surfaces 58a and 58b of the belt 31.

When the new belt 31 is wound between the primary sheave and the secondary sheave, the friction layers 63 are interposed between the belt 31 and both the sheaves. In the initial stage of driving, the carbon powder contained in the friction layers 63 enters slight gaps between the belt 31 and both the sheaves. Consequently, contact areas between the belt 31 and the respective sheaves increase. As a result, as in the first preferred embodiment, the carbon powder functions as a slip-stopper for the belt 31.

In the first preferred embodiment, the carbon powder is used as a slip-stopper for the belt 31. However, the present invention is not limited to this preferred embodiment. Other kinds of powder such as carbon black may be used.

Specifically, graphite powder, which is a kind of carbon black, is usable. It is preferable to use graphite powder with a grain size of 5 μm to 150 μm. When graphite powder is used to form a friction layer, first, a liquid-phase material obtained by mixing graphite powder with a binder and a diluent is prepared. The liquid-phase material is applied to at least one of a primary sheave, a secondary sheave, and a belt.

The binder is resin for fixing the graphite powder to the primary sheave, the secondary sheave, or the belt. As this resin, acrylic resin or olefin resin is suitable taking into account drying time and loadings of the liquid-phase material. The diluent keeps viscosity of the liquid-phase material properly to make it easy to adjust density and thickness of the friction layer and improve work efficiency in applying the liquid-phase material. Examples of the diluent include an ester solvent represented by butyl acetate, a ketone solvent represented by methyl ethyl ketone, a petroleum solvent represented by hexane, and an alcohol solvent represented by methyl alcohol.

It is desirable that a compounding ratio of the graphite powder, the binder, and the diluent is set to 2 to 80 wt % for the graphite powder and the remaining 20 to 98 wt % for the binder and the diluent.

It is possible to use powdery zinc oxide or particulate silica powder for stopping the slipping of the belt 31. However, the carbon powder is inexpensive compared with zinc oxide and is advantageous in terms of cost. Besides, the carbon powder has low hardness compared with silica and does not easily damage the sheave. Thus, taking into account cost and an effect on sheaves, it is desirable to use the carbon powder.

In the first preferred embodiment, friction layers are formed on both the primary sheave and the secondary sheave. However, the present invention is not limited to this. Friction layers may be formed on one of the primary sheave and the secondary sheave. According to this constitution, powder contained in the friction layers is fed to the other sheave, which has no friction layer, via the belt. Therefore, it is possible to prevent slipping between both the sheaves and the belt.

When the present invention is carried out, friction layers may be formed on all of the primary sheave, the secondary sheave, and the belt.

The vehicle according to the present invention is not limited to a motorcycle. The present invention is similarly applicable to, for example, an ATV (All-Terrain Vehicle) with three or four wheels for running on rough grounds or to a snowmobile.

According to various preferred embodiments of the present invention, the infusible powder prevents slipping of the belt at the initial stage of driving. Consequently, without increasing the thrust for clamping the belt, the torque transmission efficiency can be improved between the primary sheave and the belt and between the secondary sheave and the belt. Therefore, a desired transmission torque can be obtained from the beginning of driving and trial-run is made unnecessary.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A belt for a continuously variable transmission that is endlessly wound between a primary sheave and a secondary sheave, the belt comprising:
   contact surfaces arranged to be directly clamped by the respective primary and secondary sheaves and arranged to transmit torque of the primary sheave to the secondary sheave, the contact surfaces including a plurality of recesses; and
   friction layers including infusible powder disposed in the plurality of recesses of the contact surfaces; wherein
   a composition of the infusible powder is different from a composition of the contact surfaces of the belt.

2. A belt for a continuously variable transmission, comprising:
   a plurality of resin blocks including contact surfaces arranged to be directly clamped by a primary sheave made of metal and a secondary sheave made of metal, the contact surfaces including a plurality of recesses;
   a coupling member arranged to endlessly couple the plurality of resin blocks such that the belt is endlessly wound between the primary sheave and the secondary sheave to thereby transmit torque of the primary sheave to the secondary sheave; and
   friction layers including infusible powder disposed in the plurality of recesses of the contact surfaces of the plurality of resin blocks; wherein
   a composition of the infusible powder is different from a composition of the contact surfaces of the plurality of resin blocks.

3. A belt for a continuously variable transmission according to claim 2, wherein the friction layers include a material made of a mixture of a binder and carbon black powder.

4. A belt for a continuously variable transmission according to claim 2, wherein the powder has a characteristic such that the powder is not fused by heat that is generated by friction between the contact surfaces and the primary sheave and the secondary sheave.

5. A belt for a continuously variable transmission according to claim 3, wherein the binder includes a resin selected from the group consisting of an acrylic resin and an olefin resin.

6. A belt for a continuously variable transmission according to claim 2, wherein the friction layers have a thickness sufficient to fill the plurality of recesses of the contact surfaces.

* * * * *